(12) United States Patent
Johnson et al.

(10) Patent No.: US 10,125,751 B2
(45) Date of Patent: Nov. 13, 2018

(54) MULTIMODE GAS DELIVERY FOR RAIL TENDER

(71) Applicant: Chart Inc., Ball Ground, GA (US)

(72) Inventors: Terry Johnson, Garfield Heights, OH (US); Tom Drube, Garfield Heights, OH (US)

(73) Assignee: Chart, Inc., Ball Ground, GA (US)

( * ) Notice: Subject to any disclaimer, the term of this patent is extended or adjusted under 35 U.S.C. 154(b) by 350 days.

(21) Appl. No.: 14/553,967

(22) Filed: Nov. 25, 2014

(65) Prior Publication Data

US 2015/0143821 A1    May 28, 2015

Related U.S. Application Data

(60) Provisional application No. 61/909,567, filed on Nov. 27, 2013, provisional application No. 61/909,884, (Continued)

(51) Int. Cl.
*F17C 3/00* (2006.01)
*F17C 7/04* (2006.01)
(Continued)

(52) U.S. Cl.
CPC .............. *F04B 15/08* (2013.01); *B61C 17/02* (2013.01); *F16L 55/1007* (2013.01); *F17C 3/00* (2013.01); *F17C 7/02* (2013.01); *F17C 7/04* (2013.01); *F17C 13/04* (2013.01); *F17C 13/06* (2013.01); *F04B 2015/081* (2013.01);
(Continued)

(58) Field of Classification Search
CPC .... F17C 13/04; F17C 7/02; F17C 7/04; F17C 2201/035; F17C 2201/0109; F17C 2201/0114; F17C 2203/0391; F17C 2203/0629; F17C 2205/0126; F17C 2221/033; F17C 2221/0161; F17C 2223/0161; F17C 2265/066; F17C 2227/0121; F17C 2227/0135;
(Continued)

(56) References Cited

U.S. PATENT DOCUMENTS 2,229,082 A    1/1941    Van Vleet
2,423,436 A    7/1947    Blom
(Continued)

FOREIGN PATENT DOCUMENTS

CA    2762697 A1    6/2013
EP    0208035 A1    1/1987
(Continued)

OTHER PUBLICATIONS

European Extended Search Report, counterpart PCT Appl. No. PCT/US2014067451 10 pages (Nov. 13, 2017).

*Primary Examiner* — Keith Raymond
(74) *Attorney, Agent, or Firm* — Cook Alex Ltd.; R. Blake Johnston

(57) ABSTRACT

Disclosed is an liquid natural gas supply and delivery system with a multimode fuel gas delivery system and process. The tender is capable of supplying gaseous methane fuel to an cryogenic tank via direct pumping, pressure transfer, or any combination mode due to a configuration of pumps, heat exchangers, and piping and controls. There is redundancy in the tender and it can operate with saturated or unsaturated liquid.

11 Claims, 2 Drawing Sheets

Related U.S. Application Data filed on Nov. 27, 2013, provisional application No. 61/908,594, filed on Nov. 25, 2013, provisional application No. 61/908,632, filed on Nov. 25, 2013, provisional application No. 61/908,648, filed on Nov. 25, 2013, provisional application No. 61/908,659, filed on Nov. 25, 2013.

(51) Int. Cl.
| | |
|---|---|
| *F04B 15/08* | (2006.01) |
| *F17C 7/02* | (2006.01) |
| *F17C 13/04* | (2006.01) |
| *B61C 17/02* | (2006.01) |
| *F16L 55/10* | (2006.01) |
| *F17C 13/06* | (2006.01) |

(52) U.S. Cl.
CPC .. *F17C 2201/035* (2013.01); *F17C 2201/054* (2013.01); *F17C 2203/0391* (2013.01); *F17C 2203/0629* (2013.01); *F17C 2205/0379* (2013.01); *F17C 2221/033* (2013.01); *F17C 2223/0161* (2013.01); *F17C 2227/0107* (2013.01); *F17C 2227/0121* (2013.01); *F17C 2227/0135* (2013.01); *F17C 2227/0178* (2013.01); *F17C 2227/048* (2013.01); *F17C 2250/043* (2013.01); *F17C 2250/0447* (2013.01); *F17C 2250/0636* (2013.01); *F17C 2265/031* (2013.01); *F17C 2265/066* (2013.01); *F17C 2270/0168* (2013.01); *F17C 2270/0173* (2013.01); *Y10T 137/1624* (2015.04)

(58) Field of Classification Search
CPC ........ F17C 2227/0142; F17C 2227/015; F17C 2227/0178
See application file for complete search history.

(56) References Cited

U.S. PATENT DOCUMENTS

| | | | |
|---|---|---|---|
| 2,430,956 A | 11/1947 | Scott | |
| 2,722,336 A | 11/1955 | Wexler et al. | |
| 2,776,776 A | 1/1957 | Strong et al. | |
| 3,031,856 A | 5/1962 | Wiedmenann et al. | |
| 3,369,715 A | 2/1968 | Carter | |
| 3,631,880 A | 1/1972 | Hansel | |
| 3,818,577 A | 6/1974 | Bailey et al. | |
| 3,876,120 A | 4/1975 | Haesloop et al. | |
| 4,080,106 A | 3/1978 | Haesloop | |
| 4,119,111 A | 10/1978 | Allread | |
| 4,258,738 A | 3/1981 | Redman et al. | |
| 4,323,094 A | 4/1982 | Paulis et al. | |
| 4,361,165 A | 11/1982 | Flory | |
| 4,494,945 A | 1/1985 | Ogino | |
| 4,565,176 A | 1/1986 | Alf et al. | |
| 4,625,746 A | 12/1986 | Calvin et al. | |
| 4,667,994 A | 5/1987 | Foshee | |
| 4,860,545 A | 8/1989 | Zwick et al. | |
| 4,886,087 A | 12/1989 | Kitchen | |
| 5,193,569 A | 3/1993 | Moore et al. | |
| 5,208,979 A | 5/1993 | Schmidt | |
| 5,546,975 A | 8/1996 | Pernet | |
| 5,682,750 A * | 11/1997 | Preston | F17C 9/00 62/50.2 |
| 5,738,304 A | 4/1998 | Tavano | |
| 5,765,587 A | 6/1998 | Osborne | |
| 5,771,946 A * | 6/1998 | Kooy | F17C 6/00 141/11 |
| 5,921,266 A | 7/1999 | Meyer | |
| 5,941,268 A | 8/1999 | Ross, Jr. | |
| 6,044,647 A * | 4/2000 | Drube | F17C 7/02 141/2 |
| 6,093,247 A * | 7/2000 | Sipos | B05B 9/002 118/302 |
| 6,314,947 B1 * | 11/2001 | Roche | F02M 37/10 123/497 |
| 6,631,615 B2 | 10/2003 | Drube et al. | |
| 6,789,561 B2 | 9/2004 | Osborne | |
| 6,802,332 B1 | 10/2004 | Stuart | |
| 6,898,940 B2 | 5/2005 | Gram et al. | |
| 7,543,653 B2 | 6/2009 | Reilly et al. | |
| 8,453,688 B2 | 6/2013 | Allidieres | |
| 8,459,241 B2 | 6/2013 | Dixon et al. | |
| 8,499,549 B2 | 8/2013 | Herges | |
| 8,991,415 B1 | 3/2015 | Luppino | |
| 2005/0061366 A1 | 3/2005 | Rademacher | |
| 2005/0074331 A1 | 4/2005 | Watson | |
| 2005/0224115 A1 | 10/2005 | Cook et al. | |
| 2006/0027262 A1 | 2/2006 | Rademacher | |
| 2006/0120904 A1 | 6/2006 | Haesloop | |
| 2008/0196766 A1 | 8/2008 | Gandy | |
| 2011/0005222 A1 | 1/2011 | Hayashi et al. | |
| 2011/0146605 A1 | 6/2011 | Dixon et al. | |
| 2011/0314839 A1 | 12/2011 | Brook et al. | |
| 2012/0216919 A1 | 8/2012 | Nylund | |
| 2013/0199616 A1 | 8/2013 | Van Tassel | |
| 2014/0075965 A1 * | 3/2014 | Patelczyk | F17C 7/04 62/50.3 |
| 2015/0144203 A1 | 5/2015 | Drube | |
| 2015/0184645 A1 | 7/2015 | Johnson | |

FOREIGN PATENT DOCUMENTS

| | | |
|---|---|---|
| EP | 1308667 A | 5/2003 |
| EP | 1308667 A2 | 5/2003 |
| JP | S59147194 A | 8/1984 |
| JP | H07119894 A | 5/1995 |
| WO | WO 201391109 A1 | 6/2013 |

\* cited by examiner

MULTIMODE GAS DELIVERY FOR RAIL TENDER

REFERENCE TO PRIORITY DOCUMENT

This application claims priority to U.S. Provisional Patent Application Ser. No. 61/908,659 entitled "Multimode Gas Delivery for Rail Tender" and filed on Nov. 25, 2013. Priority to the aforementioned filing date is claimed and the provisional patent application is incorporated herein by reference.

The following U.S. Provisional patent applications are incorporated herein by reference: (1) U.S. Provisional Patent Application Ser. No. 61/908,659 entitled "Multimode Gas Delivery for Rail Tender" and filed on Nov. 25, 2013; (2) U.S. Provisional Patent Application Ser. No. 61/908,632 entitled "Pump Column Baffle for LNG Pump" and filed on Nov. 25, 2013; (3) U.S. Provisional Patent Application Ser. No. 61/908,648 entitled "SUMBERSIBLE PUMP BAFFLE FOR IN TANK PUMP" filed on Nov. 25, 2013; (4) U.S. Provisional Patent Application Ser. No. 61/908,594 entitled "SUMBERSIBLE PUMP BAFFLE FOR IN TANK PUMP" and filed on Nov. 25, 2013; (5) U.S. Provisional Patent Application Ser. No. 61/909,567 entitled "BOTTOM ACCESS IN TANK PUMP SUMP" and filed on Nov. 27, 2013; and (6) U.S. Provisional Patent Application Ser. No. 61/909,884 entitled "PUMP POSITIONING SCHEME FOR LNG RAIL TENDER" and filed on Nov. 27, 2013.

BACKGROUND

Interest in the use of liquid natural gas (LNG) as a fuel for motor vehicles has increased dramatically in recent years. LNG is relatively inexpensive and provides an alternative to fuel oil from foreign sources. In addition, it burns very cleanly, making it much easier for fleets to meet more restrictive pollution emission standards. A rail locomotive is one type of vehicle that utilizes LNG as a fuel. The rail locomotive hauls a tender car, or rail tender, that contains the locomotive's LNG for fuel. There are various ways to provide the LNG from the rail tender to the locomotive's engine.

One way is to provide a pump that is submersed within LNG in a tank of the rail tender. The pump is configured to pump the LNG to the locomotive when pressure within the tank is insufficient to drive LNG to the engine based on pressure alone. When pressure in the tank is sufficient, LNG can be driven to the locomotive by tank pressure alone through the pump. Such systems include an economizer circuit that is used to relieve high pressure within the tank. The economizer circuit typically includes a regulator that allows vapor from the tank to be delivered to the locomotive when the pressure in the tank rises above a predetermined level. By pulling vapor from the tank, the pressure in tank falls dramatically and pressure within the tank is relieved.

Another type of system is a saturation delivery style system that requires the LNG to be saturated (warmed) to a boiling pressure slightly above the operational input pressure to the engine, which may be in the range of 125-135 psig for example. Once saturated, the LNG is of sufficient pressure to enable pressure transfer of the LNG to the locomotives of the rail system. Such systems can also include an economizer system.

There are advantages and disadvantages to both a pump style delivery system and a saturation delivery style. In view of this, there is a need for improved systems and methods for delivering gas in a rail car system that combines various modes of delivering cryogenic fuel to a use device.

SUMMARY

Disclosed is an LNG tender with a unique gas delivery system and process. In an embodiment, the tender is capable of supplying gaseous methane fuel from an LNG cryogenic tank via direct pumping, pressure transfer, or any combination mode due to a unique configuration of one or more pumps, heat exchangers, piping and controls as described herein. There is functional redundancy in the combination of delivery systems for reliability and the tender can operate with saturated or unsaturated liquid. This is of unique benefit since the unsaturated, pumping, mode may well warm the liquid up in normal use and eventually be better delivered by the saturated mode.

The disclosed system uses characterized seat proportional flow control to direct excess LNG vapor (excess to that delivered to the engine) for pressure building within the LNG tender, simultaneous with vapor delivery to the engine(s). Thus rapid liquid temperature and tank pressure conditioning can be performed with excess system capacity without dedicated equipment and redundancy.

In an embodiment, the LNG delivery system enables multimode delivery that includes several delivery modes including (1) a saturated liquid pressure mode; (2) a cold liquid false vapor pressure mode; (3) a direct pumping mode; (4) an economizer gas delivery mode; or, combinations thereof.

In one aspect, there is disclosed a cryogenic fuel storage and supply system for a use device comprising: an insulated tank containing a supply of liquid cryogen with a headspace above the liquid cryogen; a liquid fuel line connecting the liquid cryogen in the tank to a use device; a pump inside the tank and adapted to pump the liquid cryogen through the liquid fuel line toward the use device when the pump is activated; a heat exchanger in the liquid fuel line and adapted to vaporize liquid cryogen for delivery to the use device; an economizer line communicating with the headspace in the tank and adapted to direct vapor in the headspace toward the engine when the a predetermined pressure in the tank is achieved; a gravity line communicating with the liquid cryogen in the tank and adapted to deliver liquid cryogen to the liquid fuel line; and a pressure build line connecting the heat exchanger to the tank, the pressure build line adapted to deliver excess vapor from the heat exchanger to the tank, wherein the heat exchanger can simultaneously deliver vapor to the engine and vapor to the tank.

The details of one or more variations of the subject matter described herein are set forth in the accompanying drawings and the description below. Other features and advantages of the subject matter described herein will be apparent from the description and drawings, and from the claims.

DETAILED DESCRIPTION

Before the present subject matter is further described, it is to be understood that this subject matter described herein is not limited to particular embodiments described, as such may of course vary. It is also to be understood that the terminology used herein is for the purpose of describing a particular embodiment or embodiments only, and is not intended to be limiting. Unless defined otherwise, all technical terms used herein have the same meaning as commonly understood by one skilled in the art to which this subject matter belongs.

The system is described herein in terms of a natural gas fuel storage and supply system for vehicles powered by liquid natural gas. However, the disclosed system may be used to store and supply a variety of alternative cryogenic liquids to a variety of alternative use devices. For example, the fuel storage and supply system can be used with engines relating to compressors, generators, heating and air conditioning systems and virtually any other system where an engine is required.

Disclosed is an LNG tender that employs a fuel storage and supply system with a unique fuel gas delivery system and process. The tender is capable of supplying gaseous methane fuel to an LNG cryogenic tank via direct pumping, pressure transfer, or any combination mode due to the unique configuration of pumps, heat exchangers, and piping and controls. There is redundancy in the tender and it can operate with saturated or unsaturated liquid.

The disclosed system uses excess LNG vapor (excess to that delivered to the engine) for pressure building within the LNG tank, simultaneous with vapor delivery to the engine(s). The pressure build vapor may be a portional stream of effluent from a vaporizer. Thus, the pressure build is a pumped pressure build versus static head delivery for pressure building. The disclosed system provides LNG storage and use for as long as possible. It provides great flexibility for delivery of LNG while minimizing heat intrusion into the tender's LNG.

Figure 1:
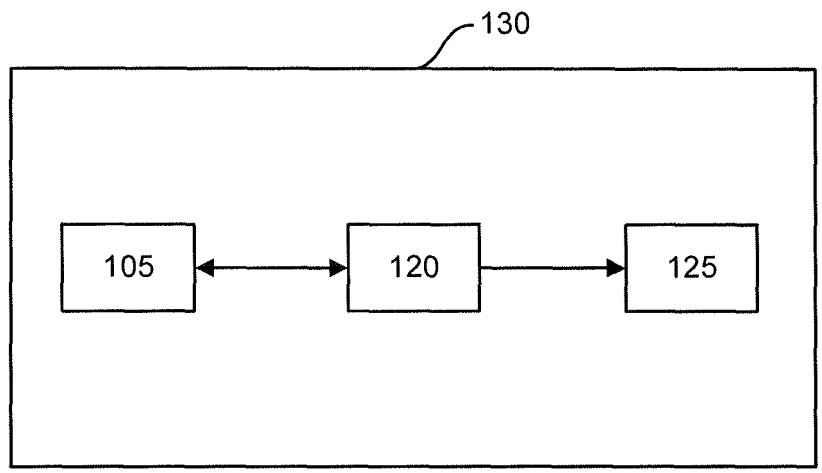
FIG. 1 show an exemplary plumbing schematic for a multimode gas delivery system.

The disclosed system provides multimode delivery of LNG for purposes of minimizing the heat intrusion to the LNG and to maximize the amount of LNG that can be delivered to an engine. FIG. 1 shows a schematic representation of a natural gas fuel storage and supply system for a vehicle powered by liquid natural gas stored in a tank 105. In an embodiment, the tank 105 includes an outer tank (or jacket) that surrounds or contains an inner tank in a vacuum insulated manner such that there is a vacuum space contained between the inner and outer tanks. The tank 105 contains a supply of fuel such as liquid natural gas (LNG) and a gas head above the LNG. The tank 105 may be a horizontal storage tank of the type commonly used as fuel tanks on vehicles where the tank is mounted to the underside of the vehicle. The tank and associated components, however, may be mounted to the vehicle by any method known in the art.

The system includes a plumbing assembly 120 comprised of pipes (or any type of appropriate fluid conduit) and one or more centrifugal submersible pumps, one or more heat exchanger(s)/vaporizer(s), one or more pressure control valves, and a pressure build piping circuit configured such that liquid may flow by gravity (i.e. static head) through the heat exchanger(s) to the engine 125. The plumbing assembly 120 may be at least partially inside and partially outside the tank and it connects the tank 105 to an engine 125 (or other gas use device) for supplying LNG to the engine 125 (or to multiple engines). An embodiment of the plumbing assembly for achieving the various modes of delivery is described herein although the configuration of the plumbing system may vary. The system may be mounted on an LNG-powered vehicle 130 such as a rail car and also includes at least one pressure sensor and/or temperature sensor coupled to the tank, plumbing assembly, and/or engine.

Figure 2:
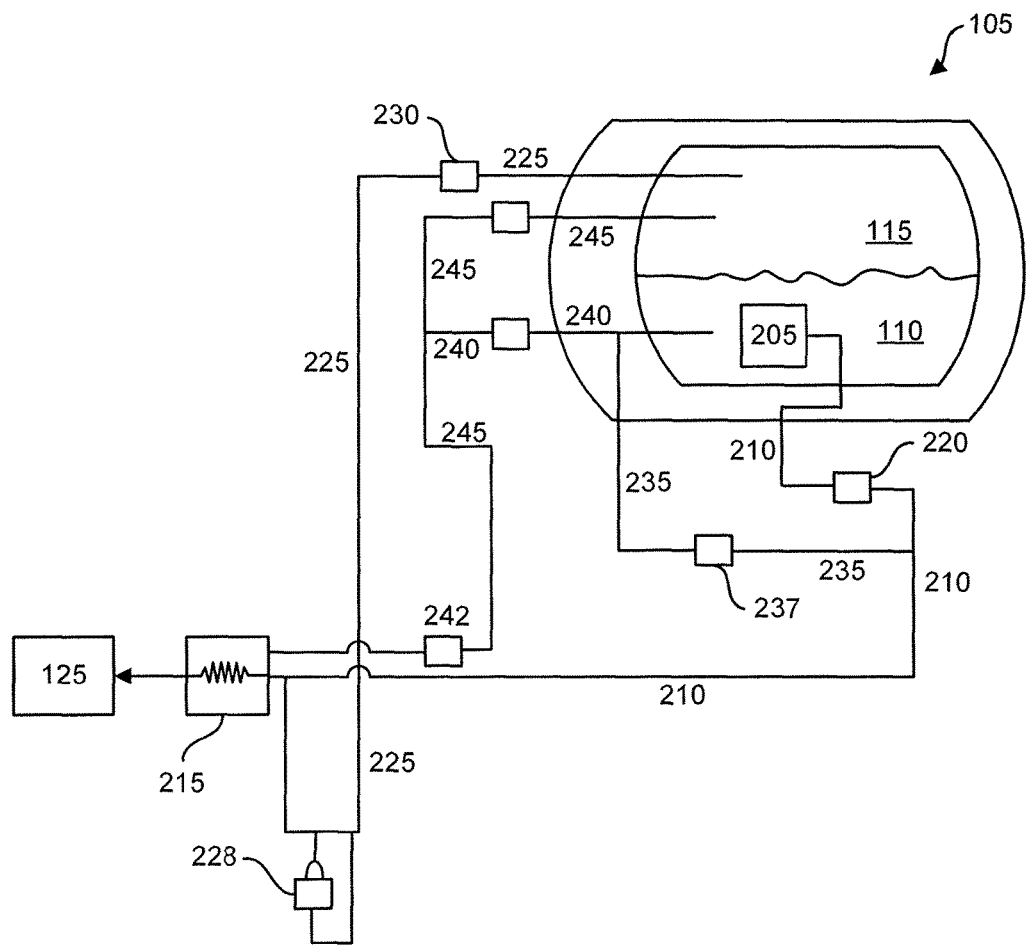
FIG. 2 shows a schematic view of an example embodiment of a multimode natural gas fuel storage and supply system.

FIG. 2 shows a schematic view of an example embodiment of the multimode natural gas fuel storage and supply system. A pump 205 is submersed within a supply of LNG 110 stored in the tank 105. Suitable pumps are known in the prior art. In an embodiment, the pump 205 is a centrifugal pump adapted to directly pump the LNG to the engine 125 when the LNG is at its lowest operational temperature, such as in the range of −258 degrees Fahrenheit. The pump capacity is sufficiently large to enable simultaneous supply of gas to the engine 125 while also pressure building the tank or saturating the LNG.

As mentioned, the tank 105 may include an outer tank (or jacket) that surrounds or contains an inner tank. The pump 205 may optionally be positioned within a pump column that provides efficient access to the pump 205. An LNG withdrawal line 210 communicates with the pump such that the pump 205 can drive LNG through the LNG withdrawal line 210 toward the engine 125, such as when the LNG is cooler than the saturation temperature, or below boiling pressure slightly above the operational input pressure to the engine.

At least one vaporizer or heat exchanger 215 is positioned upstream of the engine 125 along the LNG withdrawal line 210. The heat exchanger 215 is adapted to vaporize the LNG prior to injection to the engine 125. An outlet of the vaporizer may communicate with injectors of the engine 125 for delivering gas to the engine. The vaporizer may optionally be heated using a variety of methods known in the art. These include recirculating coolant from the engine or electric heating devices. At least one control valve 220 is disposed along the LNG withdrawal line 210.

With reference still to FIG. 2, the system further includes an economizer line 225. The economizer line 225 communicates at one end with the gas head 115 and at another end with the LNG withdrawal line 210 upstream of the heat exchanger 215. A regulator 228 is located in the economizer line 225 and allows vapor to be delivered to the engine from the gas head 115 when the pressure in the tank 105 rises above a predetermined level set at the pressure regulator 228. By pulling vapor from the gas head 115, instead of liquid through the LNG withdrawal line 210, the pressure in the tank falls. At least one control valve 230 is disposed along the economizer line 225.

A gravity withdrawal line 235 communicates with LNG 110 in the tank 105 via a saturated gas line 240. The gravity withdrawal line 235 also communicates with the LNG withdrawal line 210 such that LNG can be delivered to the LNG withdrawal line 210 when the tank pressure is at a sufficient level. At least one control valve 237 is disposed along the gravity withdrawal line 235.

A pressure build line 245 communicates with the gas head 115 and permits excess gas stream from the heat exchanger 215 to be delivered back to the gas head 115. At least one control valve 242 is disposed along the pressure build line 245 for controlling flow therethrough. The system may include a control system that includes one or more microprocessors for controlling operation of the pump and control valves. An outlet of the heat exchanger 215 is coupled to a pressure control valve of the pressure build line and is configured to release an excess stream (when present) of the vaporized LNG back to the LNG tender. In this regard, the heat exchanger 215 has sufficient capacity to supply the engine 125 with LNG and to also achieve simultaneous pressure build/saturation of the LNG within the tank 105. In an embodiment, the system does not include the pressure build line and the system relies on the operation of the pup to create pressure in the tank until the LNG is saturated, at which point a saturation delivery is possible.

In one mode of operation, which can be an initial mode of operation, the system provides fuel to the engine 125 via direct pumping such as when the pressure within the tank is low. The pump 205 is caused to pump LNG out of the tank 105 through the LNG withdrawal line 210. The LNG passes through the heat exchanger 215 where it is vaporized and passed to the engine 125. Any excess LNG is passed back to the tank 105. This unsaturated, pumping mode may well warm the LNG up in normal use and such that the LNG can be better delivered by the saturated mode when the LNG is sufficiently warm. The flow of excess LNG back to the tank is controlled by a variable speed pump. The speed the of the pump (and accordingly the proper flow to the locomotive engine) is achieved by a feedback control loop based on a pump discharge pressure target, which is set to the suitable range for the locomotive engine requirements.

As the LNG level in the tank 105 drops, incremental pressure build within the storage tank can be added. The pressure build provides intermittent fluid delivery if the pump 205 temporarily drop below the net positive suction head (NPSH) required level.

The system saturates the remaining LNG in the tank 105 (while there is still sufficient NPSH available for pumping) to deliver the last portions of LNG from the tank via a saturated fuel transfer mode. As mentioned, the unsaturated, pumping mode may well warm the LNG up in normal use. The saturation mode delivery of LNG to the engine occurs through the saturated gas line 240. Heat can be added to the LNG only as required in minimized dosages.

The valves are logic controlled to direct a vaporized stream from the heat exchanger to the tank for purposes of saturating the liquid to higher operational pressures. As mentioned, the logic controlled valves can also direct a vaporized stream from the heat exchanger to the gas head 115 via the pressure build line 245 for purposes of building vapor pressure in the tank 105 to either increase subcool for improving pumping efficiency or for building pressure sufficient to pressure transfer the LNG to the vaporizors/engines without operating the pumps. Furthermore, the logic controlled valves enable economizing of the LNG vapor within the tank (economizing is delivery of the vapor to the engine) via the economizer line 225. LNG can also be delivered to the engine via the gravity withdrawal line 235.

A multimode scheme where direct pumping is used for the majority of the fluid delivery to the locomotives with pressure build and/or bulk saturation at the very bottom tank levels permit more delivery of contents to the locomotive(s) while simultaneously minimizing total heat input throughout the cycle. This would maximize the hold time for the LNG and maximizing delivery of contents.

Although embodiments of various methods and devices are described herein in detail with reference to certain versions, it should be appreciated that other versions, embodiments, methods of use, and combinations thereof are also possible. Therefore the spirit and scope of the appended claims should not be limited to the description of the embodiments contained herein.

The invention claimed is:

1. A cryogenic fuel storage and supply system for a use device comprising:
    an insulated tank containing a supply of liquid cryogen with a headspace above the liquid cryogen;
    a liquid fuel line connecting the liquid cryogen in the tank to the use device;
    a pump inside the tank and adapted to pump the liquid cryogen through the liquid fuel line toward the use device when the pump is activated, wherein the pump has a capacity sufficiently large to provide simultaneous supply of gas to an engine while also pressure building the tank or saturating the liquid cryogen in the tank;
    a heat exchanger in the liquid fuel line and adapted to vaporize liquid cryogen for delivery to the use device, wherein the heat exchanger has capacity to simultaneously deliver vapor to the engine and vapor to the tank;
    an economizer line communicating with the headspace in the tank and adapted to direct vapor in the headspace toward the engine when a predetermined pressure in the tank is achieved and
    a pressure build line connecting the heat exchanger to the headspace of the tank, the pressure build line adapted to selectively deliver excess vapor from the heat exchanger to the headspace of the tank;
    a saturated gas line that connects the heat exchanger to the liquid cryogen in the tank, wherein the saturated gas line fluidly communicates with the pressure build line and also to a gravity line that also communicates with the liquid fuel line;
    said pressure build line and said saturated gas line configured to selectively deliver vapor generated by the heat exchanger to the headspace and the liquid cryogen in the tank;
    said gravity line in fluid communication with the liquid cryogen in the tank and connected to the liquid fuel line at a junction;
    a first control valve positioned in the liquid fuel line between an outlet of the pump and the junction;
    a second control valve positioned within the gravity line between the liquid cryogen in the tank and the junction;
    wherein the system operates between multiple modes of operation including (1) an initial, direct pumping operational mode wherein the first and second controls valves are open and the system provides liquid fuel to the use device via direct pumping by the pump via the liquid fuel line and the heat exchanger and wherein the system passes excess liquid fuel back to the tank; (2) a pressure build operational mode wherein the system intermittently provides liquid fuel to the tank via an incremental pressure build; and (3) a saturated delivery mode wherein the system provides fuel to the use device by gravity or pressure transfer by closing the first control valve and opening the second control valve;
    and wherein the system uses the direct pumping operational mode for a majority of fuel delivery to the use device and the pressure build operational mode is used during low fuel levels in the tank; wherein the saturated gas line has an inlet joined to the pressure build line and an outlet positioned within the tank and wherein the gravity line is joined to the saturated gas line between the saturated gas line inlet and the saturated gas line outlet.

2. A system as in claim 1, wherein the liquid cryogen is liquid natural gas.

3. A system as in claim 1, further comprising the gravity line communicating with the liquid cryogen in the tank and adapted to deliver liquid cryogen to the liquid fuel line without operation of the pump.

4. A system as in claim 1, wherein operation of the pump heats the liquid cryogen in the tank to a saturation temperature.

5. A system as in claim 1, further comprising at least one valve that controls delivery of liquid cryogen through the liquid fuel line or the economizer line.

6. A system as in claim 1, further comprising at least one valve that controls delivery of excess vapor from the heat exchanger to the tank.

7. A system as in claim 3, wherein liquid cryogen is delivered to the engine via the gravity line only when the temperature of the liquid cryogen is below a saturation temperature of the liquid cryogen.

8. A system as in claim 1, wherein the tank comprises an inner tank and an outer jacket.

9. A system as in claim 1, wherein the economizer line includes a pressure regulator that opens the economizer line for vapor to be delivered to the engine from the headspace when pressure in the tank rises above a predetermined level.

10. A system as in claim 1, wherein the system is configured to intermittently provide liquid fuel to the tank during the pressure build operational mode by intermittently opening the second control valve and intermittently closing the first control valve.

11. A system as in claim 1 wherein during the direct pumping operational mode, the liquid fuel pumped to the heat exchanger is vaporized and directed to the use device.

* * * * *